United States Patent [19]

Kemper

[11] Patent Number: 4,856,371
[45] Date of Patent: Aug. 15, 1989

[54] TRACTION DRIVE TRANSMISSION SYSTEM

[75] Inventor: Yves J. Kemper, Bloomfield Hills, Mich.

[73] Assignee: Tractiontec Corporation, Bloomfield Hills, Mich.

[21] Appl. No.: 51,353

[22] Filed: May 19, 1987

Related U.S. Application Data

[63] Continuation-in-part of Ser. No. 25,113, Mar. 12, 1987, abandoned.

[51] Int. Cl.$^4$ ............................................. F16H 37/06
[52] U.S. Cl. .......................................... 74/690; 74/191
[58] Field of Search ................. 74/677, 687, 689, 690, 74/691, 865, 191

[56] References Cited

U.S. PATENT DOCUMENTS

| | | | |
|---|---|---|---|
| 2,181,380 | 11/1939 | Pollard | 74/691 |
| 3,251,243 | 5/1966 | Kress | 74/689 |
| 3,406,597 | 10/1968 | de Brie Perry | 74/865 |
| 3,548,682 | 12/1970 | Schofield et al. | 74/865 |
| 3,641,843 | 2/1972 | Lemmens | 74/751 |
| 3,777,593 | 12/1973 | Mooney et al. | 74/687 |
| 3,969,958 | 7/1976 | Miyao et al. | 74/687 |
| 4,233,851 | 11/1980 | Kemper | 74/191 |
| 4,297,918 | 11/1981 | Perry | 74/690 |
| 4,363,247 | 12/1982 | Weseloh | 74/677 |
| 4,382,392 | 5/1983 | Meyerle et al. | 74/687 |
| 4,434,681 | 3/1984 | Friedrich et al. | 74/677 |
| 4,628,766 | 12/1986 | de Brie Perry | 74/691 |
| 4,630,494 | 12/1986 | Kemper | 74/191 |

FOREIGN PATENT DOCUMENTS

| | | | |
|---|---|---|---|
| 172701 | 2/1986 | European Pat. Off. | 74/689 |
| 86/0712 | 12/1986 | Int'l Pat. Institute . | |
| 56-49456 | 5/1981 | Japan | 74/689 |
| 56-49459 | 5/1981 | Japan | 74/689 |
| 2115091 | 9/1983 | United Kingdom | 74/689 |

OTHER PUBLICATIONS

Joseph L. Tevaarwerk Notebook Entries Dated 11-4-86 and Entitled "Various Transmissions" and Discussion.

"The Perbury Transmission", by F. G. de B. Perry, ASME Paper No. 80-GT-22.

"The Leyland Perbury Transmission", Transactions of the ASME, pp. 4-7.

*Primary Examiner*—Leslie A. Braun
*Assistant Examiner*—Janice E. Chartoff
*Attorney, Agent, or Firm*—Robert F. Ziems

[57] ABSTRACT

A continuously variable transmission having a pair of plate-like omega members rotatable about and spaced on a primary transmission axis to be positioned on opposite sides of a biconical beta body, the axis of which is inclined at a large acute angle with respect to the primary transmission axis so that the beta body and omega members engage in rolling friction contact at two points of contact on opposite sides of the primary transmission axis. The omega body members are connected by an external torque cage and driven by a tubular shaft. The beta body is linked by gearing to a theta shaft rotatably supported within the omega shaft. The omega shaft carries at least one planetary gear set in which the planet gears are rotatably supported in the omega shaft and wherein the sun gear is carried by the theta shaft. By appropriate selection of the gearing linking the beta body to the theta shaft and of the ratio in the planetary set, the transmission is capable of providing a two range output with synchronous shifting between ranges.

17 Claims, 5 Drawing Sheets

TRACTION DRIVE TRANSMISSION SYSTEM

CROSS-REFERENCE TO RELATED APPLICATION

This is a continuation-in-part of U.S. application Ser. No. 025,113 filed Mar. 12, 1987 now abandoned.

BACKGROUND OF THE INVENTION

This invention relates to a continuously variable, traction drive transmissions and, more particularly, it concerns an improved multi-range transmission system of the type in which the input and output torques of a continuously variable transmission are combined as system output torque through epicyclic gearing in a manner to optimize system efficiency and speed ratio range in a compact system configuration.

U.S. Pat. No. 4,630,494 discloses several embodiments of a nutational traction drive transmission representative of a broader class of transmissions in which three frame-supported working bodies operate to transmit a mechanical power input to a rotatable output at infinitely variable output/input speed ratios within the design range of the transmission. The three working bodies have been termed, respectively, an "alpha body" which is supported by the transmission frame to be concentric with a first or primary transmission axis, a "beta body" which is supported by the alpha body to be concentric with a second axis inclined with respect to and intersecting the first axis at a point of axes intersection, and an "omega body" carried by the frame to be concentric also with the first axis. The characterization of these transmissions as "nutational" is based principally on a heretofore preferred mode of transmission operation in which the alpha body is driven in rotation about its axis to carry the beta body in a nutational path as a result of the second transmission axis or the axis of the beta body being inclined with respect to the rotational axis of the alpha body. Another unique feature of such transmissions is that the beta body, which is usually biconical in configuration, makes rolling friction contact with the omega body or omega body members at two points of rolling friction contact on opposite sides of either transmission axis so that the combined torque transmitted by rolling friction through the single beta body is reduced by one half at each of the contact points. Speed ratio variation is achieved by varying radius ratio of the rolling surfaces on the respective beta and omega bodies.

The transmission embodiments disclosed in the aforementioned U.S. Pat. No. 4,630,494 represent a departure from prior transmissions of the same general class as a result of orienting the beta and omega bodies in a generally radial configuration. As a result of this orientation, the radius ratio range available to the rolling beta and omega surfaces for a transmission of comparable size is increased substantially over prior embodiments where the beta body axis intersected the primary transmission axis at a relatively small acute angle and where the omega body was represented by a pair of internal rings shiftable axially along the conical surfaces of the beta body. Although the generally biconical configuration of the beta body remained the same as prior designs, the omega body of the more recent design takes the configuration of a pair of plate members spaced on opposite sides of the beta body and of the major portion of a disk-like alpha body. In all illustrated embodiments of U.S. Pat. No. 4,630,494, the nutational movement of the beta body was retained as a result of driving the alpha body in rotation and retaining the omega plates against rotation as the reaction body.

The heretofore preferred mode of operating such transmissions by driving the alpha body so that the beta body is carried in nutation during operation has many advantages. For example, when operating in this mode, the major range of transmission speed ratios are speed reducing; that is, ratios in which the output speed is lower than the input speed. Another major advantage is that the nutational movement of the beta body, coupled with rotation about its own axis, develops gyroscopic precessional forces which act in a direction to augment or increase the normal rolling friction force under which it is held against the omega body members. As a result, bearing load requirements to maintain the rolling friction contact are reduced. On the other hand, the same gyroscopic precessional forces result in a dynamic imbalance of the moving transmission components. While the dynamic imbalance is acceptable for relatively low speed operation or with equipment which is capable of handling the resulting vibrations, vibrations resulting from the nutational movement must be compensated for by counterbalancing in applications, such as automotive drive trains, where vibration-free operation is essential. In addition, the physical organization of the omega body members, particularly the plate form omega members of the more recent radially oriented transmission, present a problem to the attainment of a practical transmission embodiment where the omega plates could rotate as a unit as would be required to avoid the beta body nutation.

In addition to the prior art relating to continuously variable traction drive transmissions, as represented by the afore-mentioned U.S. Pat. No. 4,630,494 and the patent references referred to and cited therein, it is well known in the continuously variable transmission art generally that the speed ratio range of a continuously variable transmission unit can be enhanced significantly by incorporating the unit in a system by which system input is combined with the output of the unit in epicyclic gearing. This is conventionally achieved by driving one of the three components of a planetary gear set directly with the transmission system input, driving the continuously variable unit also directly with system input, driving another of the three planetary gear components with the output of the variable speed unit and taking the system output from the third component of the epicyclic or planetary set. In this manner, operation of the continuously variable transmission unit can be made to provide a system output which varies both in direction of rotation and through an enhanced range of speed ratios in both directions of output rotation. Also, such systems are often equipped with controls to effect spaced or adjacent speed ratio ranges between which the system may be shifted to effect more than one mode of system operation.

In prior transmission systems which combine a continuously variable unit with epicyclic gearing and provide more than one mode of operation, however, one mode, typically providing a low or low/reverse range of system-output/system-input speed ratios and requiring a large amount of power recirculation through the continuously variable unit, is used with another relatively high speed ratio or principal operating mode in which full output power is supplied by the output of the continuously variable unit. The relatively high speed ratio mode can be characterized as the principal operating mode, particularly in applications like automotive drive trains, where this mode is used for a substantially greater period of operating time during the life of the system than the relatively low or low/reverse mode of operation. Although such systems having two, preferably contiguous, continuously variable speed ratio ranges are effective to provide a desired range of continuously variable speed ratios, the power transmission requirements of the continuously variable unit in both modes of operation imposes the total of unit inefficiencies on the system in both modes of operation. As a result, the power transmitting efficiency of the system is compromised. Also, the transmission of full power at all times by the unit, the least durable of components in the power train, shortens the life of the system to an extent that use of this class of transmissions has not been acceptable to the automotive industry, for example.

SUMMARY OF THE INVENTION

In accordance with the present invention, a transmission system is provided by which a continuously variable traction drive transmission unit is combined with epicyclic gearing in an manner to enable highly effective multi-mode operation of the transmission system and in which power transmitted by the unit in the principal system operating mode is kept at an optimal minimum by splitting power transmitted from system input to system output in this mode between the continuously variable unit and a direct connection of system input with system output. Such operation is achieved by planetary gearing or the equivalent thereof which is shiftable between negative and positive ratio factors to deploy the respective operating modes so that in a relatively low or low/reverse speed ratio mode, the system operates as a speed reducer whereas in the relatively high speed ratio or principal mode, the system operates in overdrive as a speed multiplier.

The continuously variable transmission unit used in the system is preferably one having the desirable geometric configuration and proportions of the general transmission embodiments disclosed in U.S. Pat. No. 4,630,494 but constructed to enable unit operation without nutation of any unit working body. This operation of the unit is effected by driving the omega plates of the transmission in rotation through an external coupling cage while retaining the alpha body against rotation.

It is preferred that the epicyclic gearing be embodied in planetary gearing capable of providing two gear ratios and having two sets of planet gears supported by a common carrier. The respective negative and positive ratio factors of the planetary gearing may be obtained by a variety of gearing configurations depending on the connection of system input, unit output and system output components with the gearing. In a preferred embodiment, the common carrier is incorporated in the system input shaft, which is tubular, with the unit output selectively linked to one or the other of the sun gears of two planetary sets. System output in the embodiment is from a ring gear which is also common to both planetary sets.

As an alternative to the use of two planetary gear sets, the continuously variable transmission unit may be provided with selectively engagable output reversing gears. A single planetary gear set external to the unit may be used to effect substantially the same multi-mode operation of the transmission system.

A principal object of the present invention is therefore the provision of a highly compact, efficient continuously variable transmission system. Other objects and further scope of the invention as well as additional features thereof will become apparent from the detailed description to follow taken in conjunction with the accompanying drawings in which like parts are designated by like reference numerals.

DETAILED DESCRIPTION OF THE PREFERRED EMBODIMENTS

Figure 1:
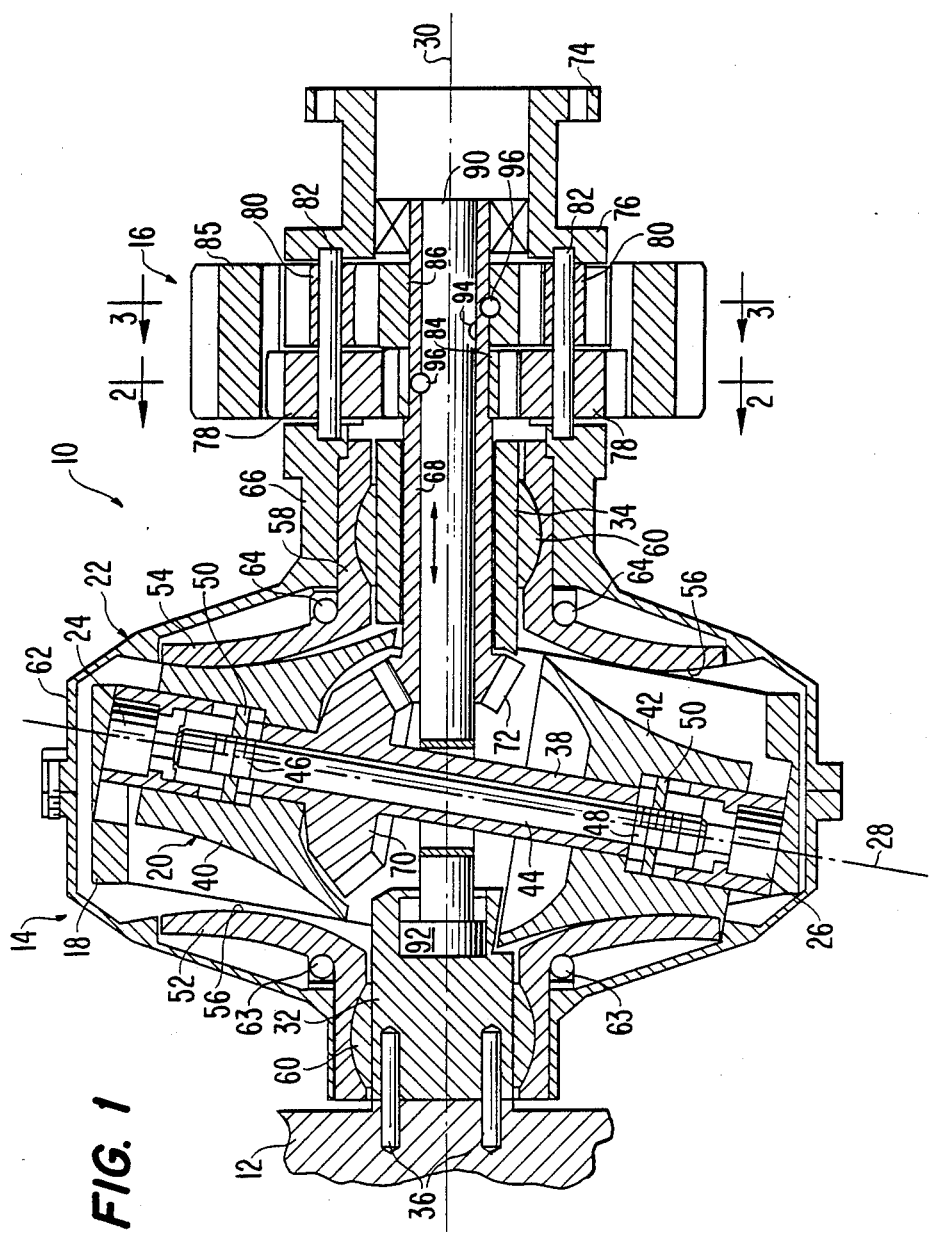
FIG. 1 is a longitudinal cross section illustrating a preferred embodiment of the present invention.
Figure 2:
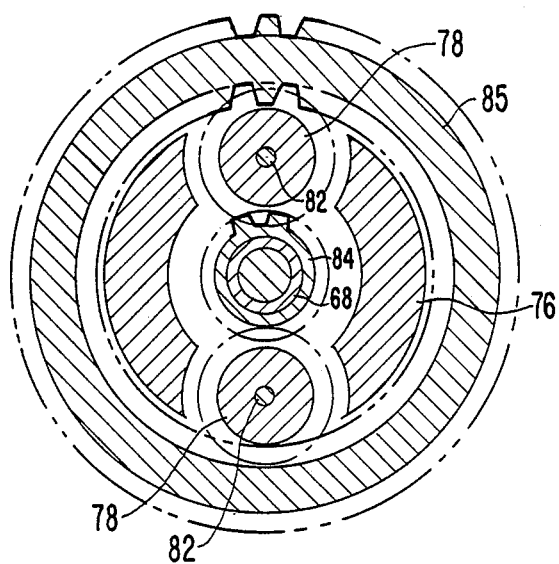
FIG. 2 is a cross section on line 2—2 of FIG. 1.
Figure 3:
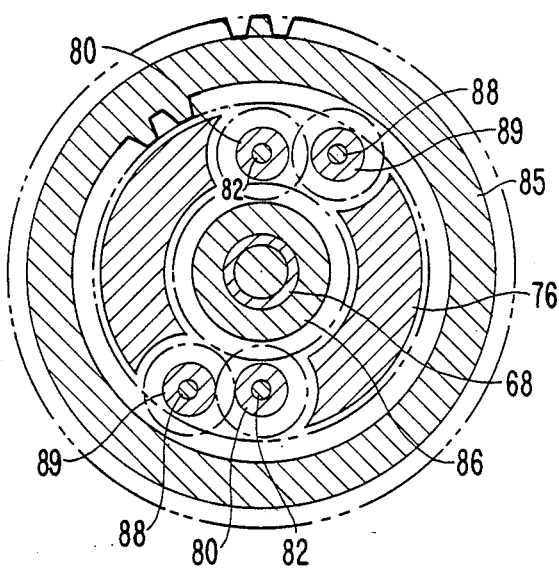
FIG. 3 is a cross section on FIG. 3—3 of FIG. 1.

In FIGS. 1–3 of the drawings, a preferred embodiment of a transmission system in accordance with the present invention is generally designated by the reference numeral 10. It is to be noted that while all working components of the system 10 are illustrated in these drawing figures, the external frame or housing from which the illustrated components are supported only partially illustrated in FIG. 1 and designated by the reference numeral 12. The system contained within the frame or housing 12 thus includes a continuously variable transmission unit 14 and a planetary gearing unit 16.

The unit 14, like the transmission units disclosed in U.S. Pat. No. 4,630,494, includes as major working components, an alpha body 18, a beta body 20 and an omega body assembly 22. The alpha body 18, which may be generally circular in outline, includes a pair of inwardly directed trunnion bearings 24 and 26 for rotatably supporting the beta body 20 about an axis 28 which is inclined with respect to and intersects a primary transmission axis 30 at a point S of axes intersection. The alpha body extends inwardly to a pair of hubs 32 and 34, the outboard hub 32 being secured such as by dowel pins 36 against rotation with respect to the housing 12.

The beta body 20 includes a central hollow shaft 38 which extends throughout the length of the beta body to rotatably engage the alpha body trunnions 24 and 26 at opposite ends. Slidably positioned on the shaft 38 are a pair of oppositely converging cone members 40 and 42. The cone members 40 and 42 are slidable axially of the beta body but secured for rotation therewith through a central shaft 44. The shaft 44 includes a pair of oppositely pitched threaded sections 46 and 48 engaged by radial extensions 50 on the cone members 40 and 42. Though not completely shown in FIG. 1 of the drawings, the shaft 44 and the connection of the cone members 40 and 42 to the threaded sections 48 thereon is part of a system by which relative rotation between the beta body 20 and the alpha body 18 may be used to advance the cones 40 and 42 axially along the shaft 38. The mechanism of which the shaft 44 and related components is a part, is fully disclosed in co-pending U.S. application Ser. No. 06/933,508, filed Nov. 21, 1986, by the present inventor.

The omega body assembly 22 includes a pair of plate members 52 and 54, each having a generally radial rolling surface of revolution 56 about the primary transmission axis 30 extending to a central hub 58 supported by bearings 60 for rotation on the hubs 32 and 34 of the alpha body 18. The plates 50 and 52 are connected as a unit by an external torque cage 62. The torque cage 62 is rotatably coupled with the omega plates 52 and 54 through ball ramp mechanisms 63 and 64 which operate to carry the plates 52 and 54 in rotation with the cage 62 and in addition, exert an axial force tending to move the two plates 52 and 54 toward each other in response to torque between the plates 52 and 54 and the cage 62. The cage, as shown, in integral with a tubular input or omega shaft 66 to be described in more detail hereinafter.

The beta body shaft 38 is linked to a unit output or "theta" shaft 68 by a gear 70, carried by or otherwise fixed to the shaft 38, in mesh with a gear 72 on the theta shaft 68. While the significance of the gearing 70,72 will be described in more detail below, it will be noted from the components thus far described that rotation of the omega body cage 62 will carry the omega plates 52 and 54 in rotation relative to the beta body 20 which, while rotatable on its axis 28, is fixed against rotational translation about the primary transmission axis 30 by virtue of the alpha body 18 being fixed by the dowel pins 38 to the housing 12. The beta body cones 40 and 42 are retained in rolling friction engagement at two points or zones of contact with the respective omega plates 54,52. Thus, rotation of the omega plates 52 and 54 will cause rotation of the beta body 20 and its shaft 38 to drive the gear 70, the gear 72 and the theta shaft 68. The ratio at which the shaft 68 will be driven in relation to the input shaft 66 will be a function of the gearing 70,72 but more significantly the function of the relative radius of the cone members 40 and 42 and the omega plates 52,54.

The tubular input or omega shaft 66 extends through the planetary gearing unit 16 to a coupling flange 74 to which a source of power input, such as the crank shaft of an internal combustion engine (not shown), may be fixed. In the embodiment of FIGS. 1-3, the shaft 66 includes a central boss portion 76 in which two pairs of planet gears 78 and 80 are journalled on common pin shafts 82. The planet gear pair 78, thus carried by the tubular input shaft 66, mesh with a sun gear 84 adapted to be releasably coupled to the unit output shaft 68. Similarly, a sun gear 86 meshes with the planet gear pair 80 and is also releasably fixed for rotation with the unit output shaft 68. As may be seen in FIGS. 2 and 3, the boss portion 76 of the tubular shaft 66 is windowed to permit the planets 78 and 80 to extend radially through the shaft 66 and particularly, the boss portion 76 thereof.

The pair of planet gears 78 mesh directly with the sun gear 84 and with an external ring gear 85. The planet gears 80, on the other hand, are of a size so that they do not mesh directly with the inside of the ring gear 85 but rather act as idlers in mesh with a planet pair 89 as shown in FIG. 3. The planets 89 are rotatably supported on pin shafts 88 again supported by the enlarged boss portion 76 of the tubular input shaft 66.

Supported for reciprocation within the theta shaft 68 is a gear coupling shaft 90 adapted to be reciprocally adjusted by piston cylinder unit 92 in the alpha body hub 32. The reciprocable shaft 90 is provided with detentes 94 or the equivalent thereof by which ball detentes 96 may be adjusted to engage or disengage the respective sun gears 84 and 86 to or from the theta shaft 68. This arrangement, though well known, operates to engage either one or the other of the sun gears 84 and 86 with the unit output shaft 68.

Figure 4:
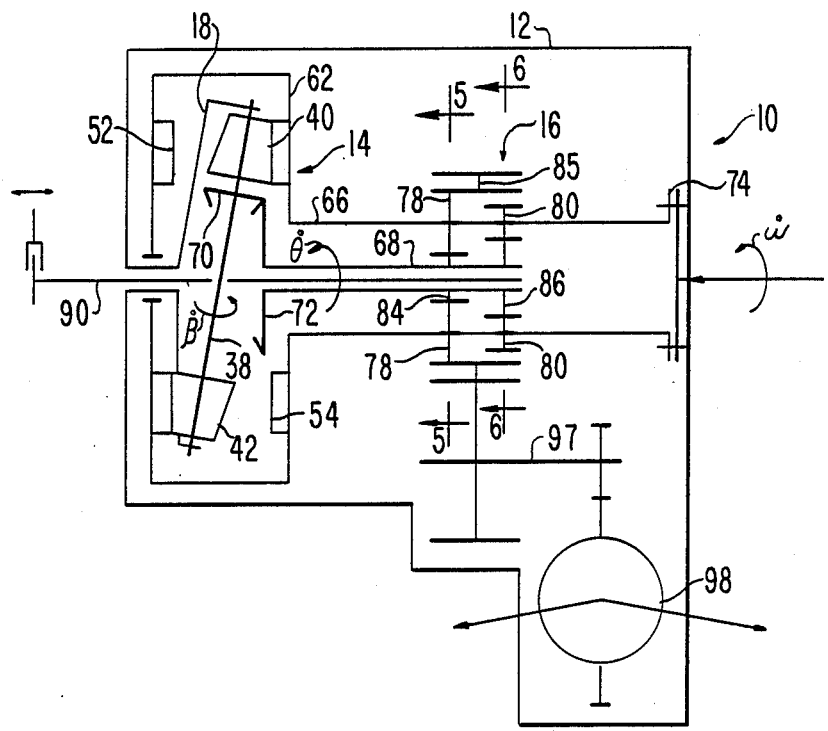
FIG. 4 is a schematic view illustrating the components of a system in accordance with the embodiment of FIG. 1.
Figure 5:
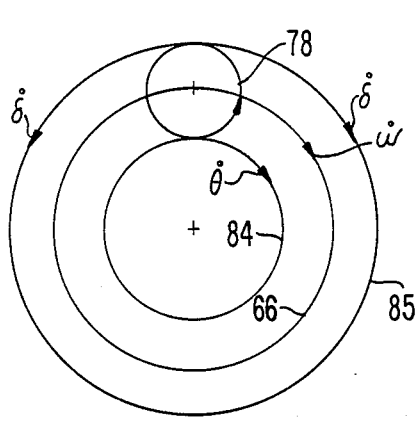
FIG. 5 is a schematic illustration of one set of planetary gearing used with the embodiment of FIG. 1.
Figure 6:
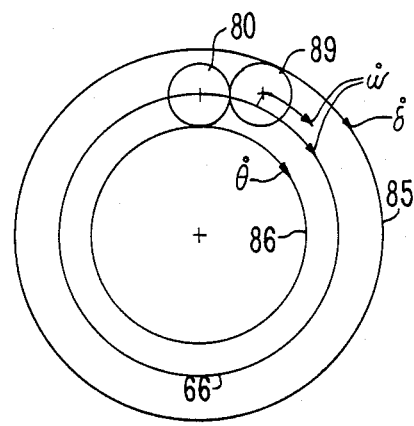
FIG. 6 is a similar view illustrating a second planetary set.

In FIGS. 4–6 of the drawings, the components of the system 10 are represented schematically in a power train including transfer gears 97 for transmission of power from the ring gear 85, through a differential 98 to the drive wheels (not shown) of an automotive vehicle, for example. From the schematic illustration of FIG. 4, it will be appreciated that the system is particularly applicable to the space constraints of a front wheel drive automotive vehicle.

While the operation of the system 10 as well as several variations thereof will be described in detail below, a summary of terms used herein and in the appended claims is in order. For example, the term, "transmission system" is intended as designating the organization of power transmitting components and controls which operate to transmit power from the flange 74 of the input shaft 66 to the ring gear 85 in the embodiment of FIGS. 1–6. A transmission system, as thus defined, is typically used with reduction transfer gearing such as the gears 97 and 98 which, though not necessarily a part of the transmission system, affect the relative meaning of other terms. The term "overdrive", for example, is commonly used in an automotive drive train context to mean that the final drive to the vehicle drive wheels operates at rotational speeds higher than the engine crank shaft which may be connected directly to the flange 74 in the illustrated embodiment. As used in the following description of operation and in the appended claims, the term "overdrive" means that the power output of the transmission system is driven at rotational speeds greater than the speed at which the system input (e.g. the flange 74 of the shaft 66) is rotated by input power. On the other hand, an overdrive ratio of 3 or 4:1 in the transmission system is likely to be reduced to a ratio of slightly more than 1:1 by reduction transfer gearing beyond the output end of the transmission system. Correspondingly, all other transmission system ratios are likewise reduced.

The meaning of the terms "continuously variable transmission unit" or the more general "transmission unit" is believed clear from the preceding description to mean those parts of the unit 14 between the input shaft 66 and the theta shaft 68. On the other hand, the terms "unit input" and "system input" are less clearly delineated because the physical components functioning to input power to the unit and to input power to the system may be embodied as one member (e.g., the shaft 66). Nevertheless, the terms are meaningful from the standpoint of understanding the respective speed ratios of the continuously variable transmission unit as distinguished from the speed ratios of the transmission system including that unit.

Finally, the term "planetary gearing" or "planetary gear set" as used herein and in the appended claims means an arrangement of planet gears supported by a carrier to provide a specific fixed gear ratio factor irrespective of whether the same gear set includes separate sun and ring gear components or whether one or the other of the sun and ring gear components of one planetary set are shared with another planetary set having a different gear ratio factor. Thus, a compound planetary gearing arrangement capable of providing two gear ratios is the equivalent of two planetary gear sets. The "ratio" or "ratio factor" of planetary gearing as used herein and in the appended claims is the ratio of rotation speed at an output component to the rotation speed of the input component when the planet carrier is grounded or held against rotation. Also, with respect to gearing, the terms "negative" and "positive" when applied to a ratio value is intended to denote the direction of a driving gear relative to a driven gear. Specifically, the ratio of a single driving spur gear and a single driven spur gear is negative because these gears rotate in opposite directions. The ratio of a driving spur gear to an internal ring gear is positive because both driving and driven gears rotate in the same direction.

To facilitate an understanding of the manner in which the embodiment of FIGS. 1–6 as thus described operates in practice, it is to be noted that the equation for the ratio of output speed ($\overset{\circ}{\delta}$) to input speed ($\overset{\circ}{\omega}$) is determined by the equation:

$$(\overset{\circ}{\delta})/(\overset{\circ}{\omega}) = P(Kp-1)+1 \qquad (1)$$

In the foregoing equation, the value (P) is the gear ratios of the unit 16 using either one of planets 78,89, and such ratios are alternately selectable; (K) is the ratio of the beta body driven gear 70 relative to the theta shaft carried gear 72; and the function (p) is the radius ratio at the contact points between the beta body cones 40 and 42 and their respective omega plates 52 and 54.

From equation (1), it will be appreciated that whenever the function (kp) is equal to 1, the output/input ratio ($\overset{\circ}{\delta}/\overset{\circ}{\omega}$) is always equal to 1 or at unity regardless of the value P. Moreover, the geometry of the transmission unit 14 enables a radius ratio value for the function (p) to extend from approximately 0.7 to 5, the function (p) being at its minimum value where the points of contact between the beta body cones 40 and 42 and the omega plates 52 and 54 are nearest to the primary transmission axes 30 whereas the maximum value of (p) is greatest or near 5 when the cones contact the omega plates at the outer ends or small diameter portions of the cones. The internal gear ratio of the unit 14, that is, the ratio of the gear 70 to the gear 72 is the reciprocal of the minimum value for (p) or 1.43. It will be appreciated that the rotational speed at the ring gear 85 or ($\overset{\circ}{\delta}$) will be equal to the speed of the input shaft 66 or ($\overset{\circ}{\omega}$) when the cones 40 and 42 contact the omega plates 52 and 54 at the large ends of the cones. In this condition, because the planets 78 and 80 are carried as a unit with the input shaft 66, synchronous shifting may occur between the sun gears 84 and 86.

The operation of the transmission system 10 may be further appreciated when values for the function P are inserted for the planet gear ratio in the unit 16. For example, if the ratio P using the planet gear 78 is equal to a −0.7 (the negative value indicating a reversal of rotational direction between the sun 84 and the ring 85 when the carrier 66 is grounded) and the ratio using the planet 89 equal to +0.5, it will be appreciated that two modes of operation will be effected by virtue of coupling the respective sun gears 84 or 86 to the theta shaft 68. The two modes are termed Mode A and Mode B which, as will be explained, correspond respectively to a system speed reduction or system underdrive mode and a system speed increasing or system overdrive mode of operation. In Mode A, the sun 84 is coupled for rotation with the theta shaft 68 whereas the sun gear 86 and the theta shaft are released for relative rotation. Thus, if in Mode A the value of (p) is maximum or 5, and the other parameters of the transmission unit 14 are as given above, then the output/input ratio will be equal to (−3.3) or providing a maximum speed ratio in a reverse direction. As the function (p) is shifted from 5 to its minimum value of 0.7, the ratio ($\overset{\circ}{\delta}/\overset{\circ}{\omega}$) will pass through zero to a forward ratio of unity or 1.0. At this point, the unit output or theta shaft 68 is shifted in its coupling from the sun gear 84 to the sun gear 86 where the planet gear ratio is a +0.5, for example. Correspondingly, the mode of system operation is shifted from Mode A to Mode B. With the cones unshifted and the value for (p) again equal to 0.7, the output/input ratio ($\overset{\circ}{\delta}/\overset{\circ}{\omega}$) will be once more equal to unity. As the radius ratio function (p) increases to a value of 5, the ratio ($\overset{\circ}{\delta}/\overset{\circ}{\omega}$) extends to an system overdrive of 4.07.

In FIGS. 5 and 6, the respective Mode A and Mode B operations are depicted graphically for the embodiment of FIGS. 1–6 with arrow heads to show the relative directions of rotation at the respective speeds used in equation (1). To understand these diagrams, it should be noted that with the parameters given for the continuously variable transmission unit 14 of the illustrated embodiment, the unit speed ratio ($\overset{\circ}{\theta}/\overset{\circ}{\omega}$) is always equal to or greater than 1/1. Thus, the unit output speed ($\overset{\circ}{\theta}$) is always equal to or greater than the unit input speed ($\overset{\circ}{\omega}$), the system input speed (also $\overset{\circ}{\omega}$) and the rotational speed of the shaft 66 on which the planets 78 and 89 are carried. In Mode A as represented in FIG. 5, therefore, when the ratio of the unit 14 is 1/1, $\overset{\circ}{\theta}$ is equal to $\overset{\circ}{\omega}$, is also equal to $\overset{\circ}{\delta}$ and the system ratio is 1/1 in the direction of system input. Assuming a constant system input speed in Mode A, the system output speed will be reduced through zero to the reverse of system input as unit output speed ($\overset{\circ}{\theta}$) is increased. Also in Mode A operation, as system output speed slows toward zero and extends beyond zero to reverse, a substantial amount of power transmitted by the system 10 is "recirculated" through the unit 14. Moreover, the work done by the unit 14 in recirculating power reduces the efficiency of the system 10. In accordance with the present invention, this reduction in efficiency is compensated for in substantial part by the efficiency curve of the unit 14. In particular, the efficiency of the unit 14 increases directly with radius ratio (p) increases. Therefore, the efficiency of the unit 14 is highest when the amount of power recirculation is greatest thus minimizing the effect of lowered system efficiency due to power recirculation through the unit. Also and from a practical standpoint, Mode A is in the nature of "start-up gearing" and is used for a relatively short period of total time in the context of system life.

In Mode B, as depicted in FIG. 6, when the unit ratio ($\overset{\circ}{\theta}/\overset{\circ}{\omega}$) is unity, the gears 80 and 89 will not rotate on their respective axes and system output speed ($\overset{\circ}{\delta}$) will equal system input speed ($\overset{\circ}{\omega}$). As unit output speed ($\overset{\circ}{\theta}$) increases, system output will increase in the same direction of rotation. It is important to note that in Mode B, no power is ever recirculated through the unit 14, and more significantly, power taken through the unit 14 to the system output (the ring gear 85) is divided or split with power transmitted directly from the shaft 66 to system output. In other words, the power handled by the unit 14 varies from minimum at a system speed ratio of unity and increases with system output speed ratio increases. Moreover, the efficiency of the continuously variable transmission unit 14 increases as unit output increases from a ratio of unity. As a result of these characteristics of Mode B operation, which in an automotive vehicle would be the principal operating mode from the standpoint of system operating duration, the power transmitting work done by the unit 14 is reduced to a point where even at the lowest operating efficiencies of the unit 14, the unit inefficiencies represent but a small portion of the overall system inefficiencies.

Figure 7A:
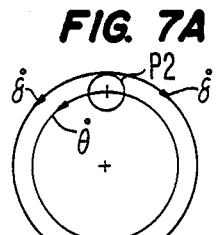
FIGS. 7–9B are schematic views, similar to FIG. 4, but depicting three variations of the planetary gearing and mode selection controls applicable to the embodiment of FIGS. 1–6.
Figure 7B:
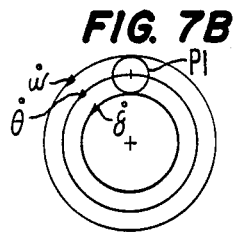
Figure 7:
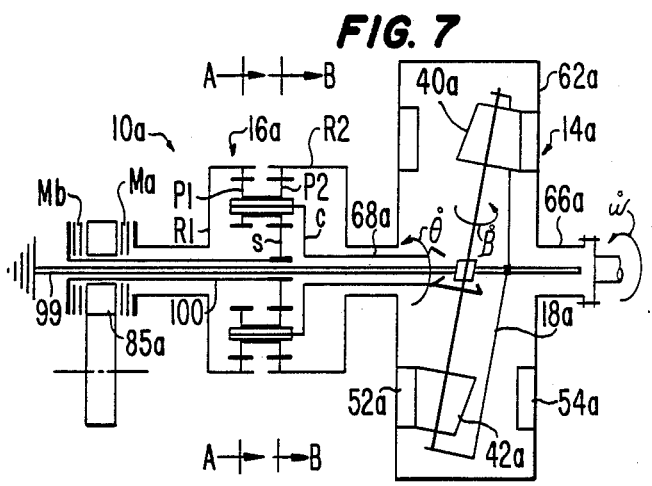
Figure 8A:
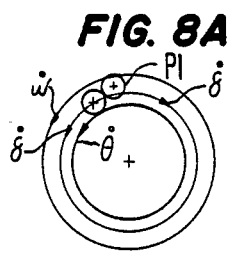
Figure 8B:
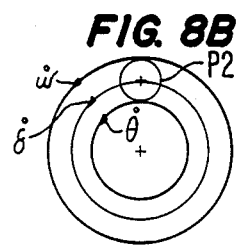
Figure 8:
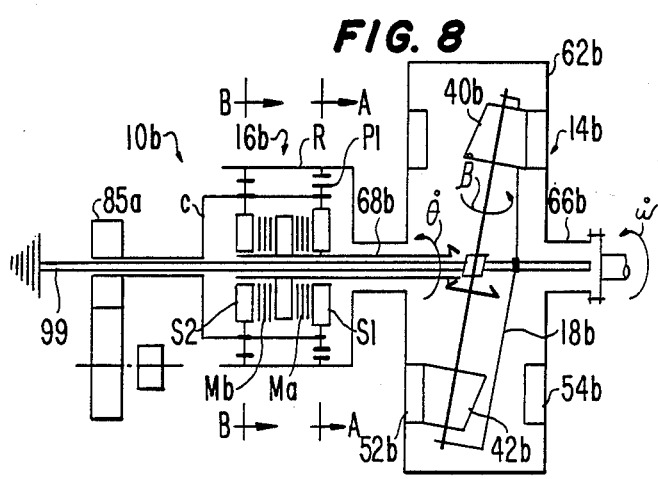
Figure 9A:
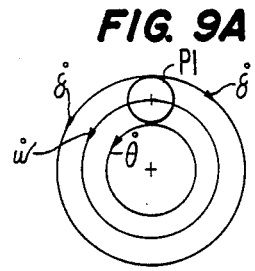
Figure 9B:
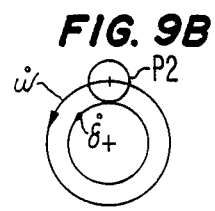
Figure 9:
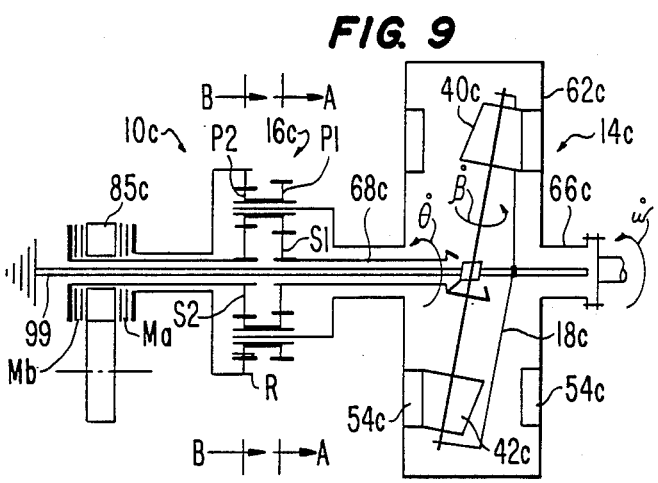

In FIGS. 7-9B of the drawings, three variations 10a, 10b and 10c of the transmission system embodiment of FIGS. 1-6 are shown schematically in the general style of FIGS. 4-6. In FIGS. 7-9, parts previously described with reference to FIGS. 1-6 are designated by the same reference numerals with a letter (i.e., a, b or c) suffix. Also, in all of the variations 10a, 10b and 10c, the organization of the transmission system is modified to provide the planetary gearing 16a, 16b and 16c between the continuously variable transmission unit 14a and the output of the system. As a result, a central grounding rod 99 extends from the output end of the system to the alpha body 18a, 18b and 18c of each variation. In all other respects, the operation of the continuously variable transmission units 14a, 14b and 14c is the same as the unit 14 described above with reference to FIG. 1.

In the transmission system 10a of FIG. 7, the planetary gearing unit 16a includes two sets of interconnected planet gears P1 and P2 carried rotatably on a carrier C connected directly to the theta shaft 68a of the unit 14a. A ring gear R2 is connected directly with the omega cage 62a and thus with the system input shaft 66a. A sun gear S, in mesh with the planets P2, is keyed to a shaft 100 releasably coupled by a clutch Mb with a system output gear 85a. A second ring gear R1 is in mesh with the planet set P1 and is adapted to be coupled to the system output gear 85a through a releasable clutch Ma.

In the system 10a, Mode A operation as described above and as illustrated in FIG. 7A is effected when the clutch Ma is engaged and the clutch Mb released. Mode B operation is effected by engagement of the clutch Mb while the clutch Ma is released. Mode B operation of the system 10a is depicted graphically in FIG. 7B of the drawings.

Operation of the system 10a is essentially the same as that of FIGS. 1-6 and need not be further described. The system-output/system-input speed ratio of the system 10a is in accordance with the equation:

$$\overset{\circ}{\delta}/\overset{\circ}{\omega} = 1/P - Kp/P + Kp \qquad (2)$$

In equation 2, the function (P) is the ratio factor of one or the other of the planet sets P1 and P2. The ratio factor of the set P1 is positive whereas the ratio factor of the set P2 is negative.

In FIG. 8 of the drawing, the system 10b includes a continuously variable transmission unit 14b which is the same as the unit 14a of the system 10a. In the system 10b, however, a common ring gear R is coupled directly with the omega cage 62b and thus with the input shaft 66b. A pair of independently rotatable planet gears supported on a carrier C are in driving mesh with the ring gear R and with a pair of sun gears S1 and S2 adapted to be releasably coupled with the theta shaft 68b by alternately engagable clutches Ma and Mb. The carrier C, in the embodiment of FIG. 8, is coupled at all times with a system output gear 85b. The operational Mode A and Mode B ranges of the system 10b of FIG. 8 are depicted respectively in FIGS. 8A and 8B. The system output/system input speed ratio is determined by the equation:

$$\overset{\circ}{\delta}/\overset{\circ}{\omega} = (1 - PKp)/(1 - P) \qquad (3)$$

As in the previous variation, the function P is either the ratios using the planets P1 and P2 are of opposite signs due to the direct connection of the planet P2 with the sun S2 and the provision of an idler planet between the ring gear R and the sun S1 of the planetary set including the planets P1.

In FIG. 9, a third system variation 10c is shown in which interconnected planets P1 and P2 are supported on a carrier C driven by the omega cage 62c. Mode A operation is effected by connection of a ring gear R by way of a releasable clutch Ma to an output gear 85c. Mode B operation in the embodiment of FIG. 9 is effected by coupling the sun gear S2 to the output gear 85c by way of the releasable clutch Mb. Operation of the system 10c is in accordance with Equation 1 discussed above with reference to FIGS. 1-6.

From the foregoing description of the embodiment of FIGS. 1-6 and the variations thereof represented by FIGS. 7-9, it will be seen that the invention may be practiced using an assortment of different double planetary gear sets to effect the basis two modes of operation described. Yet, certain features are germane to all of the illustrated variations. For example, the continuously variable transmission unit 14 is not, in any of the variations, connected directly to system output. As a result, the power handled by the unit 14 is kept at a minimum at least during operation of the system to transmit output power corresponding to the principal or forward direction of drive. Also, in all of the described variations of the planetary gear set 16, the planets of both gear sets are always supported by a common carrier. This arrangement simplifies the attainment of directional reversal in shifting between the two planetary sets. As described above with reference specifically to FIGS. 5 and 6, the efficiency of the transmission unit in all variations is optimized for the power handling requirements of the system. Finally, in all embodiments, power may be delivered directly to the omega cage 62. This latter feature is significant particularly to automotive drive train applications inasmuch as the omega cage 62 may be adapted as the crank shaft flywheel in a manner such that the shock loading of a piston driven crank shaft may be absorbed or damped ahead of power transmitting components in the transmission system.

Figure 10:
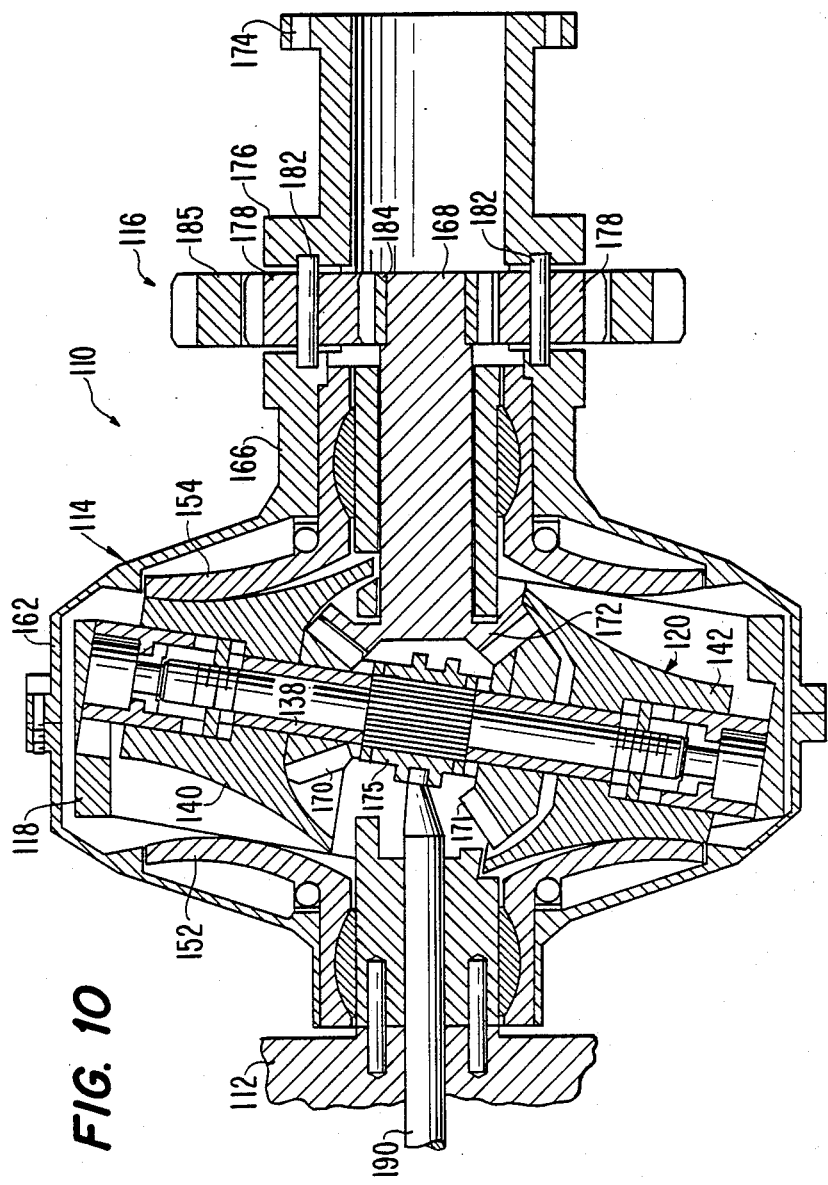
FIG. 10 is a longitudinal cross section similar to FIG. 1 but illustrating an alternative embodiment of the present invention.

In FIG. 10, an alternative embodiment of the system is illustrated in which parts previously identified by reference numerals are designated by the same tens and digits values but to which the value one hundred has been added. In this embodiment, beta body 120 is modified to include a pair of gears 170 and 171 which normally rotate relative to the beta body shaft 138. Gears are alternately coupled for rotation with the shaft 138 by a shiftable clutch member 175.

As a result of the location of the gears 170 and 171 on opposite sides of the theta shaft gear 172, the theta shaft 168 will be rotated in opposite directions by alternate engagement of either one of the two gears 170 and 171 with the beta body shaft 138. Also, the theta shaft gear ratio factor (K) will vary depending on which of the two gears 170 and 171 is deployed. Thus, in the embodiment of FIG. 10, the two operating modes, Mode A and Mode B, are effected by shifting the value and sign of the factor (K) in equation 1 given above. In this respect, the theta shaft 168 is connected to the sun 184 of a single planetary set arranged in essentially the same manner as either one of the two suns of the planetary set 16 of FIG. 1.

It is to be noted that in the embodiment of FIG. 10, the geometry of the continuously variable transmission unit 114 does not permit contiguous ranges of unit or system speed ratios. In other words, a shift between Mode A and Mode B operation with the embodiment of FIG. 10 would require a power shift using a friction clutch (not shown), for example, to effect the mode shifting operation.

In light of the foregoing description and accompanying drawing illustrations, it will be appreciated that as a result of the present invention, a highly effective and compact continuously variable transmission system is provided by which the principal objective among others are completely fulfilled. It will also be appreciated that modifications and/or changes may be made in the described embodiments without departure from the invention. Accordingly, it is to be understood that the foregoing description and accompanying drawing illustrations are illustrative of preferred embodiments only, not limiting, and that the true spirit and scope of the present invention will be determined by reference to the appended claims.

I claim:

1. A continuously variable power transmission system comprising:
    a continuously variable traction drive unit having a unit input, a unit output and variable radius ratio defining means for varying the unit output/input speed ratios continuously between minimum and maximum values;
    a system input;
    a system output;
    gear means for combining at said system output, power at said system input with power at said unit output at system-output/system-input speed ratios of 1:1, less than 1:1 and greater than 1:1, said gear means having alternately operative ratio factors whereby operation with one of said ratio factors results in a system-output/system-input speed ratio of 1:1 or less and operation with the other of said ratio factors results in a system-output/system-input speed ratio of 1:1 or higher;
    means for alternating said ratio factors to establish two ranges of system-output/system-input speed ratios in which respectively, the output/input speed ratio of said continuously variable traction drive unit may be varied between said minimum and maximum values;
    wherein said gear means comprises planetary gearing having a pair of planet gears and a common carrier for rotatably supporting said planet gears; and
    wherein said common carrier is driven by said system input.

2. The continuously variable power transmission system recited in claim 1 wherein the planet gears of said pair are independently rotatable.

3. The continuously variable power transmission system recited in claim 2 wherein said planetary gearing includes a set of ring and sun gear components in power transmitting engagement with one of said planet gears of said pair, said sun gear component being driven by said unit output and said system output being driven by said ring gear component.

4. The continuously variable power transmission system recited in claim 1 wherein the planetary gears of said pair are rotatably interconnected.

5. The continuously variable power transmission system recited in claim 4 wherein said planetary gearing includes a first sun gear driven by said unit output and in mesh with one of said pair of planet gears, and ring and second sun gear components in mesh with the other of said pair of planet gears, said ring and second sun gear components alternately driving said system output.

6. A continuously variable power transmission system comprising:
    a continuously variable transmission unit having a unit input, a unit output and traction means for varying the unit output/input speed ratios continuously between a minimum value on the order of 1:1 and a maximum value;
    a system input;
    a system output;
    planetary gear means including first and second planet gears, a common rotatable carrier supporting said first and second planet gears, first and second sun gears drivably coupled with said first and second planet gears, respectively, and ring gear means in meshing engagement with said planet gears for coupling said planetary gear means and said system output, the ratio of said planetary gear means using one of said first and second planet and sun gears being positive and the ratio of said planetary gear means using the other of said first and second planet and sun gears being negative;
    means for drivably connecting said carrier and said system input; and
    means for alternately coupling said first and second sun gears to said unit output, thereby to establish two ranges of system-output/system-input speed ratios, one such range extending to 1:1 whereas the other of said two ranges extends from 1:1 and in which ranges respectively, the output/input speed ratio of said continuously variable transmission unit may be varied between said minimum and maximum values.

7. The continuously variable transmission a system recited in claim 6 wherein said system input comprises a rotatable shaft including said common carrier.

8. The continuously variable transmission system recited in claim 7 wherein said rotatable shaft is also said unit input.

9. A continuously variable transmission comprising:
    a generally biconical beta body having a pair of variable radii beta rolling surfaces of revolution about a beta axis;
    means defining a primary transmission axis;
    means for supporting said beta body to orient said beta body axis in the plane of said primary transmission axis at a acute angle of intersection with respect to said primary transmission axis and to retain said beta axis against rotational translation about said primary transmission axis but permitting free rotation of said beta body about said beta axis;
    a pair of plate-like omega body members supported for rotation about and spaced on said primary transmission axis, one such omega body member on each of opposite sides of said beta body, each of said omega body members having omega rolling surfaces of revolution about said primary transmission axis;

means for retaining said omega rolling surfaces in rolling friction contact with said beta rolling surfaces at two points of contact;

means for adjusting the radius ratio of said beta and omega rolling surfaces equally at said two points of contact continuously between minimum and maximum radius ratio values;

a theta shaft rotatable about said primary transmission axis;

theta gear means for transmitting torque from said beta body to said theta shaft;

torque input means for driving said omega body members in rotation;

an omega shaft rotatable about said primary transmission axis, said omega shaft being linked for rotation with said omega plates and said torque input means;

planetary gear means for linking said omega shaft and said theta shaft;

torque output means linked to said planetary gear means;

at least one of said theta gear means and said planetary gear means having alternately operative positive and negative gear ratios to provide two ranges of speed ratios between said torque input means and said torque output means;

wherein said planetary gear means comprises planetary gearing having at least one planet gear and a common carrier for rotatably supporting said at least one planet gear; and wherein said common carrier is driven by said torque input means.

10. The continuously variable power transmission system recited in claim 9 wherein said planetary gear means includes a pair of planet gear sets to provide said two ranges of speed ratios.

11. The continuously variable power transmission system recited in claim 9 wherein said theta gear means includes a pair of gears alternately linked to said beta body and a gear on said theta shaft in mesh with both of said pair of gears.

12. A continuously variable transmission comprising:
a generally biconical beta body having a pair of variable radii beta rolling surfaces of revolution about a beta axis;

means defining a primary transmission axis;

alpha means for supporting said beta body or orient said beta body axis in the plane of said primary transmission axis at an acute angle of intersection with respect to said primary transmission axis, said alpha means further fixing said beta axis against rotational translation about said primary transmission axis but permitting free rotation of said beta body about said beta axis;

a pair of plate-like omega body members supported for rotation about and spaced on said primary transmission axis, one such omega body member on each of opposite sides of said beta body, each of said omega body members having omega rolling surfaces of revolution about said primary transmission axis;

means for retaining said omega rolling surfaces in rolling friction contact with said beta rolling surfaces at two points of contact;

means for adjusting the radius ratio of said beta and omega rolling surfaces equally at said two points of contact continuously between minimum and maximum radius ratio values;

a theta shaft rotatable about said primary transmission axis;

gear means for linking said beta body and said theta shaft;

a tubular omega shaft rotatable about said primary transmission axis and said theta shaft;

torque transmitting cage means for coupling said omega shaft and both of said omega body members;

wherein the ratio of said gear means is the reciprocal of the minimum value of said radius ratio; and including first and second planetary gear sets each having a sun gear, a planet gear and a ring gear, said planet gears being rotatably supported by said omega shaft, said sun gears adapted to be fixed alternately for rotation with said theta shaft, and said ring gear being connected to a torque load driven by the transmission.

13. The continuously variable transmission recited in claim 12 wherein said omega shaft is a power input shaft and said theta shaft is a power output shaft.

14. The continuously variable transmission recited in claim 12 wherein said planetary gear sets include a single ring gear common to both said sets.

15. The continuously variable transmission recited in claim 14 wherein said planet gears for each of said sets are rotated in opposite directions for the same rotational direction of the suns in both said first and second sets.

16. The continuously variable power transmission system recited in claim 10 wherein the planetary gears of said pair are rotatably interconnected.

17. The continuously variable power transmission system recited in claim 10 wherein said planetary gearing includes a first sun gear driven by said theta shaft and in mesh with one of said pair of planet gears, and ring and second sun gear components in mesh with the other of said pair of planet gears, said ring and second sun gear components alternately driving said torque output.

* * * * *